United States Patent [19]

Marshall

[11] Patent Number: 5,101,873
[45] Date of Patent: Apr. 7, 1992

[54] TREE CUTTING APPARATUS

[76] Inventor: Lorry E. Marshall, Box 51, Sargent, Nebr. 68874

[21] Appl. No.: 630,266

[22] Filed: Dec. 19, 1990

[51] Int. Cl.⁵ .................................................. A01G 23/08
[52] U.S. Cl. ..................... 144/34 E; 83/928; 83/675; 83/679; 144/3 D; 144/218; 144/339
[58] Field of Search ............... 144/3 D, 34 R, 34 E, 144/218, 336, 339; 83/679, 675, 698, 928; 30/379.5

[56] References Cited

U.S. PATENT DOCUMENTS

| | | | |
|---|---|---|---|
| 2,529,934 | 11/1950 | Gracey et al. | 144/34 E |
| 3,122,184 | 2/1964 | Larson | 144/34 E |
| 3,627,002 | 12/1971 | Fulghum, Jr. | 144/34 E |
| 4,046,179 | 9/1977 | Crawford | 144/34 E |
| 4,081,007 | 3/1978 | Loigerot | 144/34 E |
| 4,681,145 | 7/1987 | York | 144/2 N |
| 4,690,185 | 9/1987 | Hamilton et al. | 144/34 R |
| 4,848,425 | 7/1989 | Mercier et al. | 144/34 R |

*Primary Examiner*—W. Donald Bray
*Attorney, Agent, or Firm*—Zarley McKee Thomte Voorhees & Sease

[57] ABSTRACT

A tree cutting apparatus includes a frame having forward and rearward ends, with a pair of generally planar blades rotatably mounted on the forward end of the frame. The blades are mounted spaced apart within the same plane, each blade having a cutting edge extending around a portion of the periphery thereof. Each cutting edge has a forward and rearward end, with the cutting edge being spaced a distance from the rotational axis of each blade increasing from the forward end to the rearward end, such that the cutting edges of the blades move closer to one another as the blades rotate to cut a tree or the like.

5 Claims, 5 Drawing Sheets

TREE CUTTING APPARATUS

TECHNICAL FIELD

The present invention relates generally to tree cutting devices, and more particularly to an improved tree cutting apparatus with a slow moving cutting blade.

BACKGROUND OF THE INVENTION

Various apparatus for felling trees are well known. Examples include chain saws, rotary blades such as circular saws, and shear severing devices. Chain saws are subject to frequent failure because of the number of moving parts. Circular saws, while typically stronger and more robust, are also more bulky. Further, both chain saws and circular saws are run at high speeds with the attendant hazard from flying chips and debris. Shear severing devices require enormous amounts of power and leverage to fell trees having a diameter of more than a mere few inches.

It is therefore a general object of the present invention to provide an improved tree cutting apparatus.

Another object of the present invention is to provide a tree cutting apparatus with slow moving blades.

A further object is to provide a tree cutting apparatus which eliminates flying chips and debris during the cutting operation.

Yet another object of the present invention is to provide a tree cutting apparatus which will cut large diameter trees with only minimal power requirements.

Still another object is to provide an improved tree cutting apparatus which is simple in operation, economical to manufacture and light weight for connection to mobile vehicles.

These and other objects will be apparent to those skilled in the art.

SUMMARY OF THE INVENTION

The tree cutting apparatus of the present invention includes a frame having forward and rearward ends, with a pair of generally planar blades rotatably mounted on the forward end of the frame. The blades are mounted spaced apart within the same plane, each blade having a cutting edge extending around a portion of the periphery thereof. Each cutting edge has a forward and rearward end, with the cutting edge being spaced a distance from the rotational axis of each blade increasing from the forward end to the rearward end, such that the cutting edges of the blades move closer to one another as the blades rotate to cut a tree or the like.

DESCRIPTION OF THE PREFERRED EMBODIMENT

Figure 1:
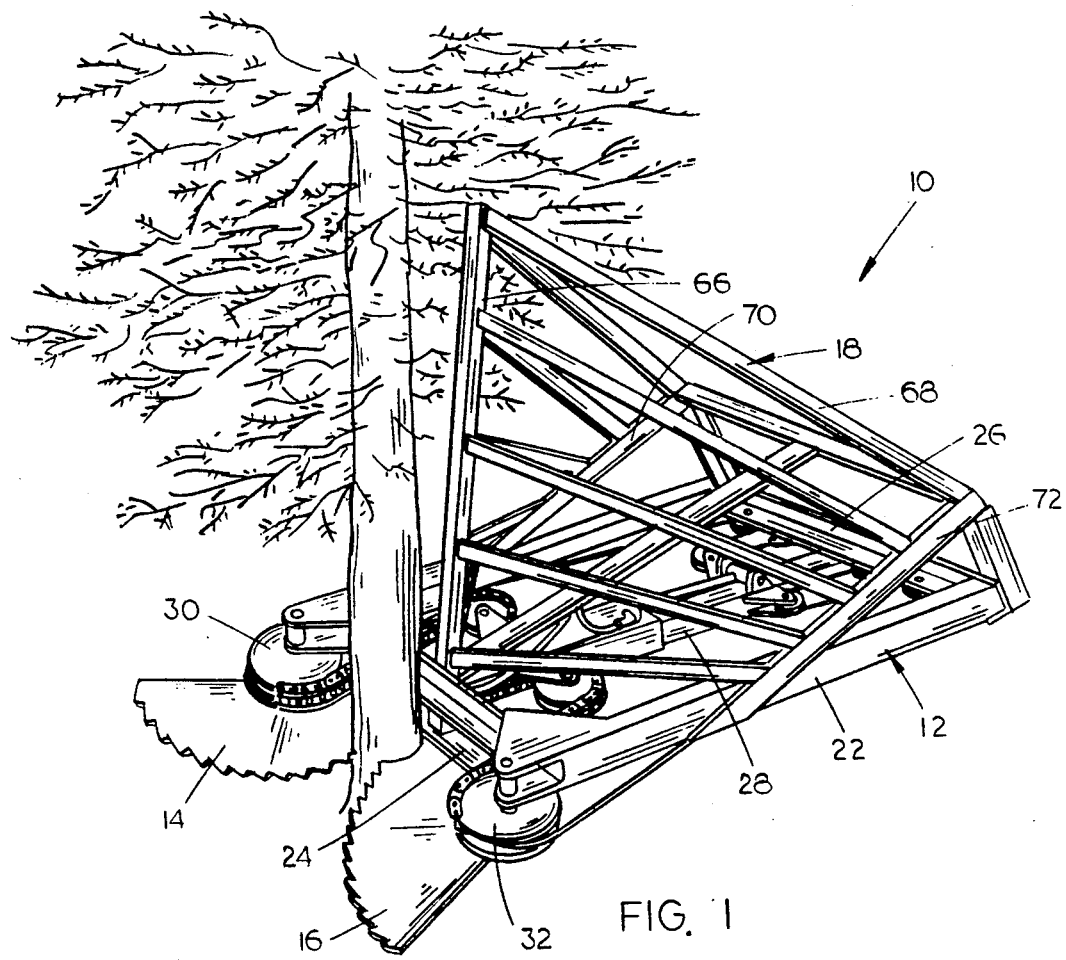
FIG. 1 is a pictorial view of the present invention cutting a tree.

Referring now to the drawings, in which identical or corresponding parts are identified with the same reference numeral, and more particularly to FIG. 1, the tree cutting apparatus of the present invention is designated generally at 10, and includes a frame 12 supporting a pair of opposingly rotatable blades 14 and 16 and a tree deflecting frame 18.

Figure 4:
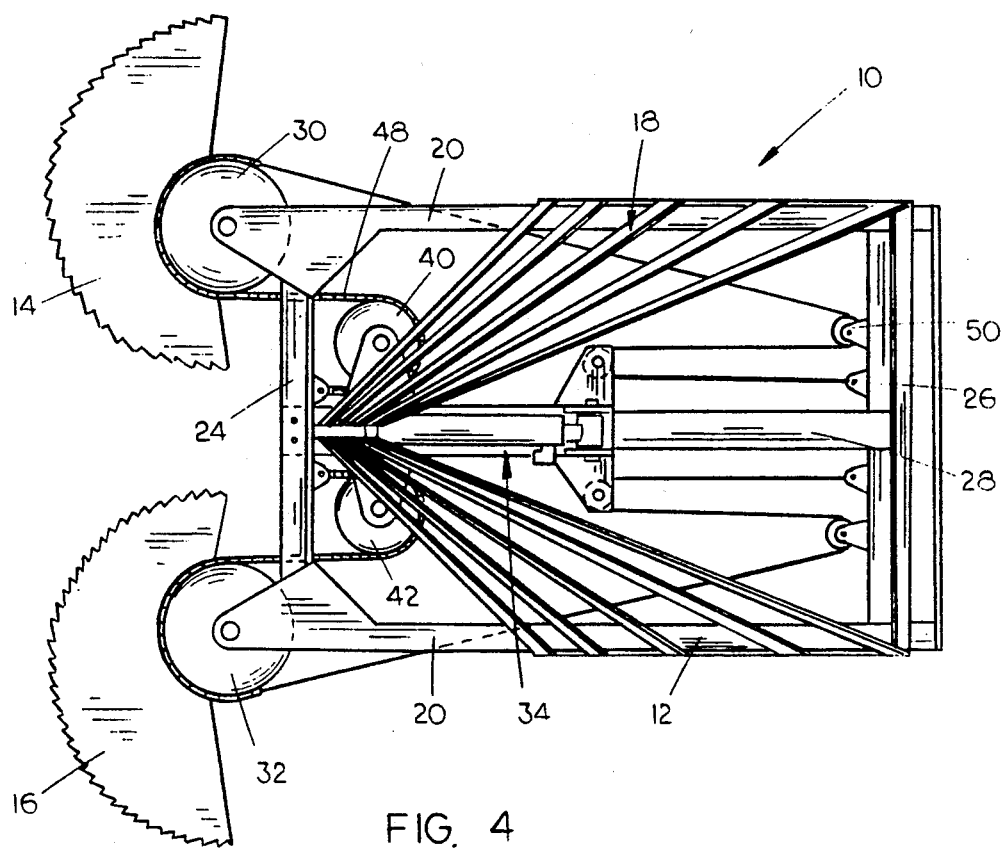
FIG. 4 is a top view of the tree cutting apparatus.

As shown in FIGS. 1 and 4, frame 12 is formed of right and left elongated members 20 and 22, which are oriented in parallel spaced apart relation by a forward cross member 24 and a rearward cross member 26. A central elongated member 28 parallel to right and left elongated members 20 and 22 extends between cross members 24 and 26 and also serves as a guide bearing, as will be discussed in more detail hereinbelow.

The forward ends of right and left elongated members 20 and 22 project beyond forward cross member 24, each elongated member 20 and 22 having a circular hub 30 and 32 rotatably mounted thereon, respectively. Blades 14 and 16 are mounted directly to hubs 30 and 32, respectively, and will rotate therewith as discussed hereinbelow.

Figure 5:
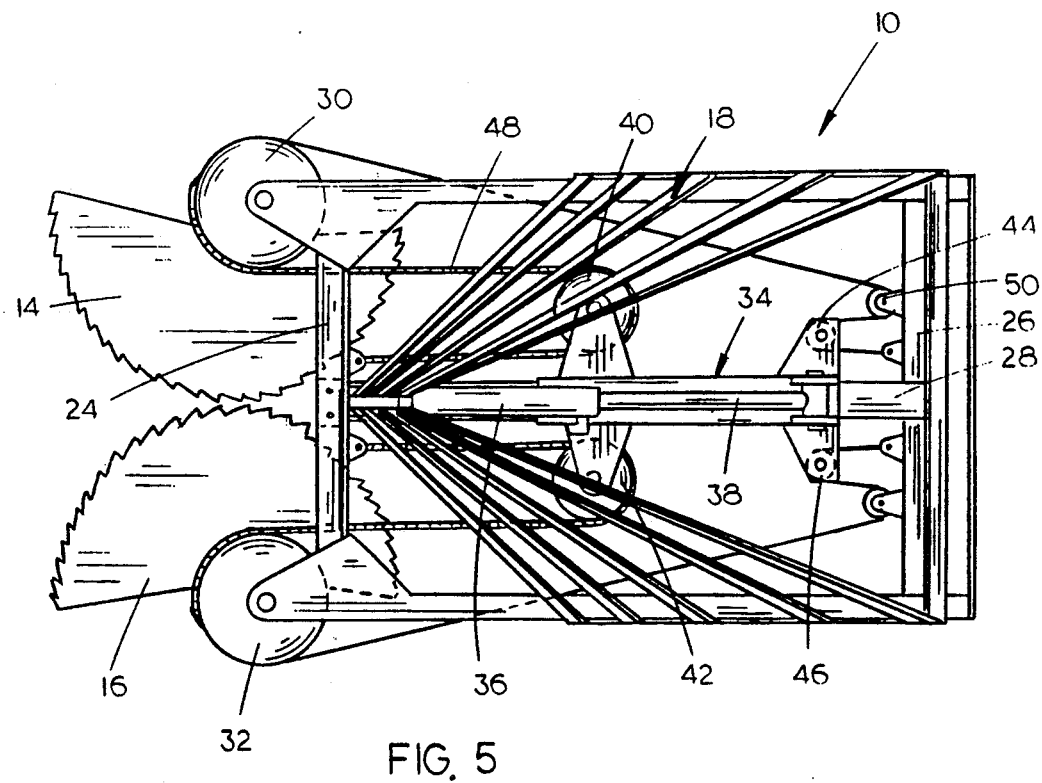
FIG. 5 is a view similar to FIG. 4 with the blades moved to a second position.
Figure 6:
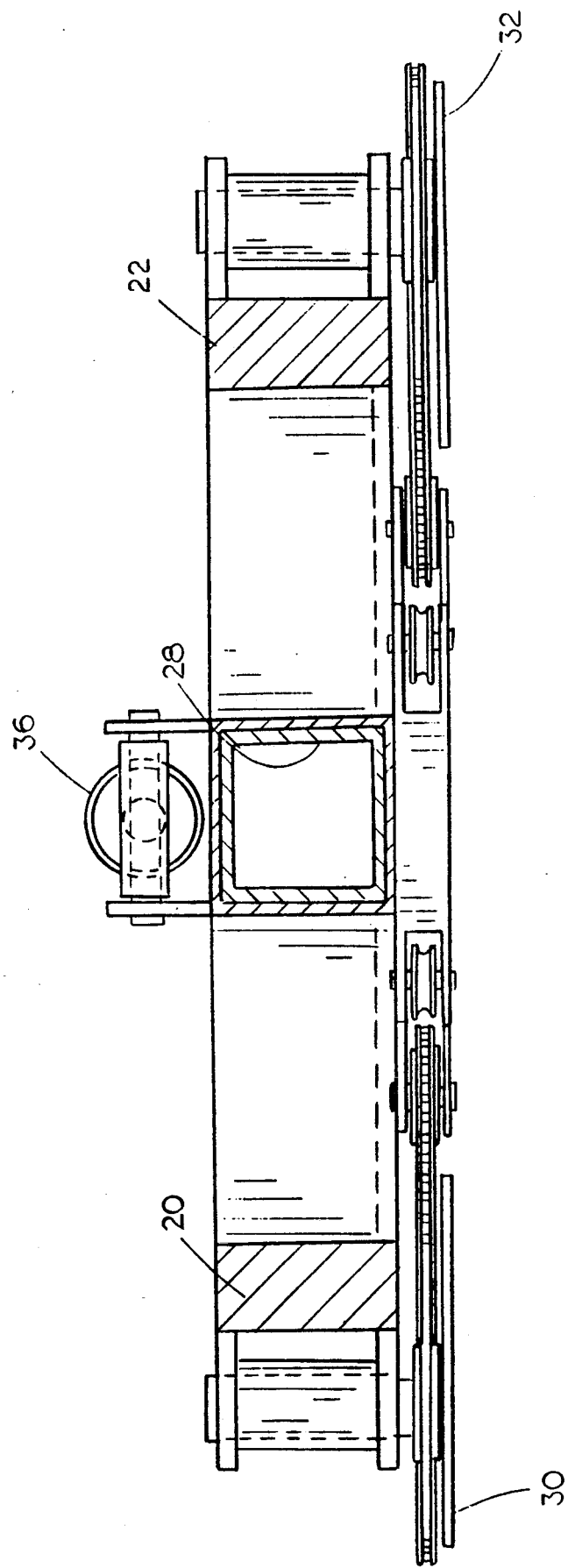
FIG. 6 is a sectional view taken at lines 6—6 in FIG. 5.

A drive bracket 34 is slidably mounted on central elongated member 28, so as to slide between forward cross member 24 and rearward cross member 26 as shown in FIGS. 4 and 5. A hydraulic cylinder 36 is connected at one end to forward cross member 24, with its extensible rod 38 connected to the rearward end of drive bracket 34. Cylinder 36 is preferably a dual action cylinder which will cause drive bracket 34 to operate between the forward position shown in FIG. 4 and the rearward position shown in FIG. 5 upon activation of the cylinder 36. In order to increase the power to rotate hubs 30 and 32, and therefore rotate blades 14 and 16, a pair of freely rotatable pulleys 40 and 42 are mounted on the right and left sides of drive bracket 34 for movement therewith. A second pair of smaller freely rotatable pulleys 44 and 46 are mounted on the right and left sides of the rearward end of drive bracket 34, as shown in FIG. 5.

In order to drive blade 14, a chain 48 is connected at one end to forward cross member 24, extended to wrap around right pulley 40, then back to engage and extend around hub 30. Chain 48 then extends around an auxiliary pulley 50 on rearward cross member 26, around smaller pulley 44 and is then connected to rearward cross member 26. In a similar fashion, a second chain 52 extends from forward cross member 24 around left pulley 42, thence around hub 32 around an auxiliary pulley 54 on rearward cross member 26, around small pulley 46 and is then connected to rearward cross member 26. While a belt or cable may be utilized in place of chains 48 and 52, chains 48 and 52 must engage hubs 30 and 32 so as to rotate the hubs upon activation of cylinder 36 and movement of drive bracket 34.

Figure 2:
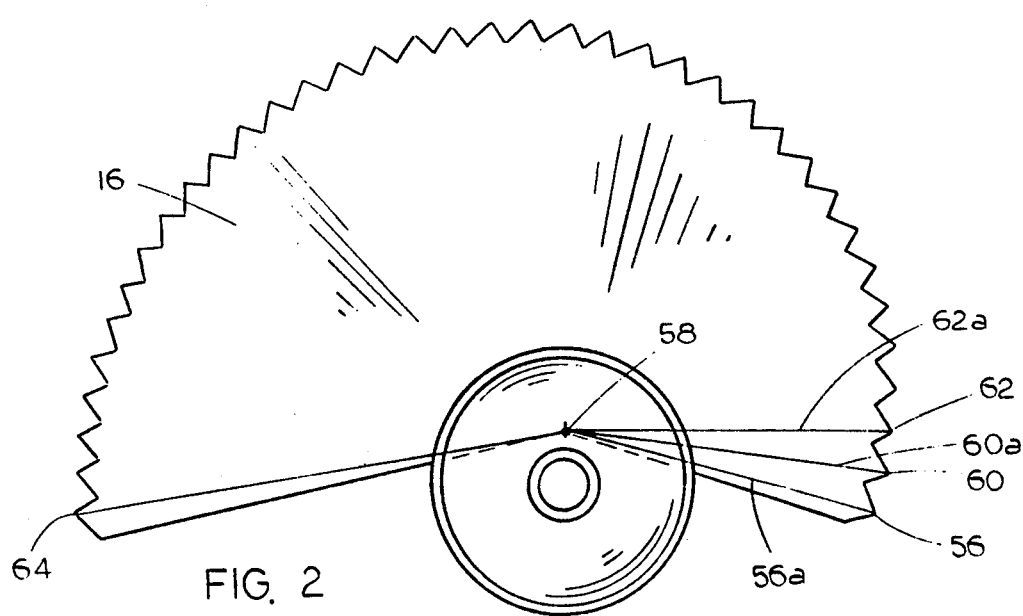
FIG. 2 is a top view of one cutting blade of the present invention.

Referring now to FIG. 2, left blade 16 is shown to show the special configuration utilized in the preferred embodiment of the invention. Blades 14 and 16 are generally elliptical in shape, and are designed such that each tooth is slightly longer as the blade rotates to cut the tree. In addition, the distance between the teeth decreases slightly throughout the "stroke" or rotation of the blades. As shown in FIG. 2, the first tooth 56 is approximately 14.375 inches from an elliptical center 58. Second tooth 60 is approximately 3/16 of an inch longer, or 14.563 inches from center 58. The distance between first tooth 56 and second tooth 60, as measured between the points, is approximately 7°. Third tooth 62 is again approximately 3/16 of an inch longer than second tooth 60, as measured along cord a from center 58. In addition, third tooth 62 is slightly closer to second tooth 60 then second tooth 60 is to first tooth 56. This may be measured by comparing the angular distance between cords 56a and 60a and between cords 60a and 62a. The angular distance between cords 56a and 60a is approximately 7°. The angular distance between cords 60a and 62a is approximately 6.9°. Each subsequent tooth is approximately 3/16 inch longer than the previous tooth, and is approximately 1/10 of a degree closer than the next previous tooth. This sequence continues for approximately 220° from first tooth 56 around center 58 to last tooth 64.

As shown in FIGS. 4 and 5, this special spacing and length of the teeth on blades 14 and 16 serves to create a uniform pressure or stress as the blades are rotated to cut the tree. The spacing and dimensions are designed such that approximately the same number of teeth engage the tree trunk to cut a similar amount of wood at any given point along saw blades 14 and 16 during the stroke of cylinder 36. In this way, saw blades 14 and 16 must only be rotated approximately 220°, or less, to fell a tree. A single stroke of cylinder 36 will accomplish this task in approximately 10 seconds. The tree will be held in position by forward cross member 24 as the blades 14 and 16 operate. No flying chips or debris are present from such slow moving blades.

Figure 3:
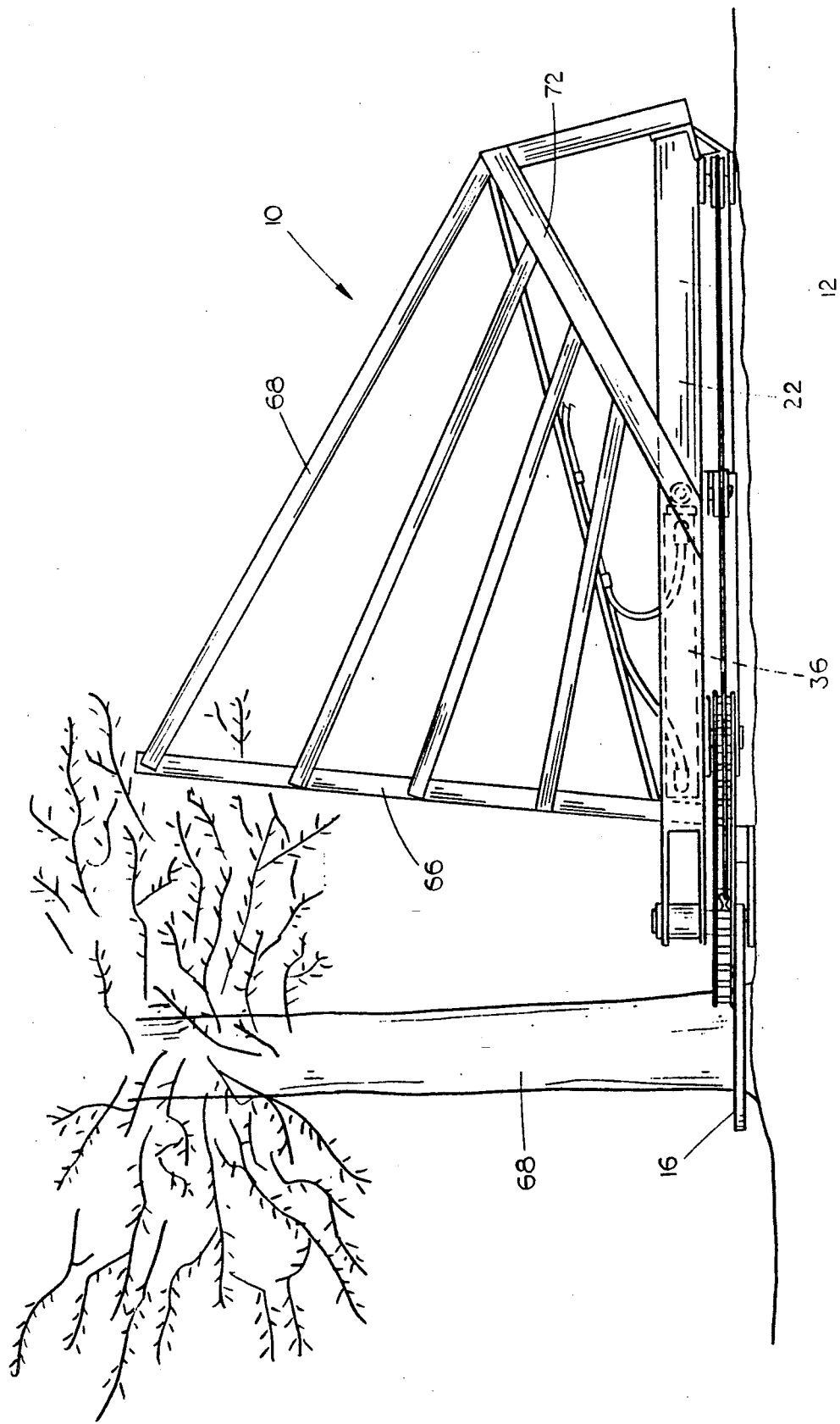
FIG. 3 is a side elevational view of the invention shown in FIG. 1.

The tree deflecting frame 18 is mounted to frame 12 and serves to deflect a felled tree from the rearward end of tree cutting apparatus 10. As shown in FIGS. 1 and 3, deflecting frame 18 has a forward upright 66 which will be located very close to the tree trunk 68 during cutting of the tree. A series of braces 68 extend from upright 66 and diverge therefrom so a to right and left support members 70 and 72. Support members 70 and 72 are preferably canted upwardly from the forward to the rearward ends for ease in connection of braces 68. In this fashion, when the tree 68 is cut, upright 66 and braces 68 will cause the tree to fall to the right or left side of the tree cutting apparatus 10, out of the way of the vehicle to which the tree cutting apparatus 10 is attached.

Figure 7:
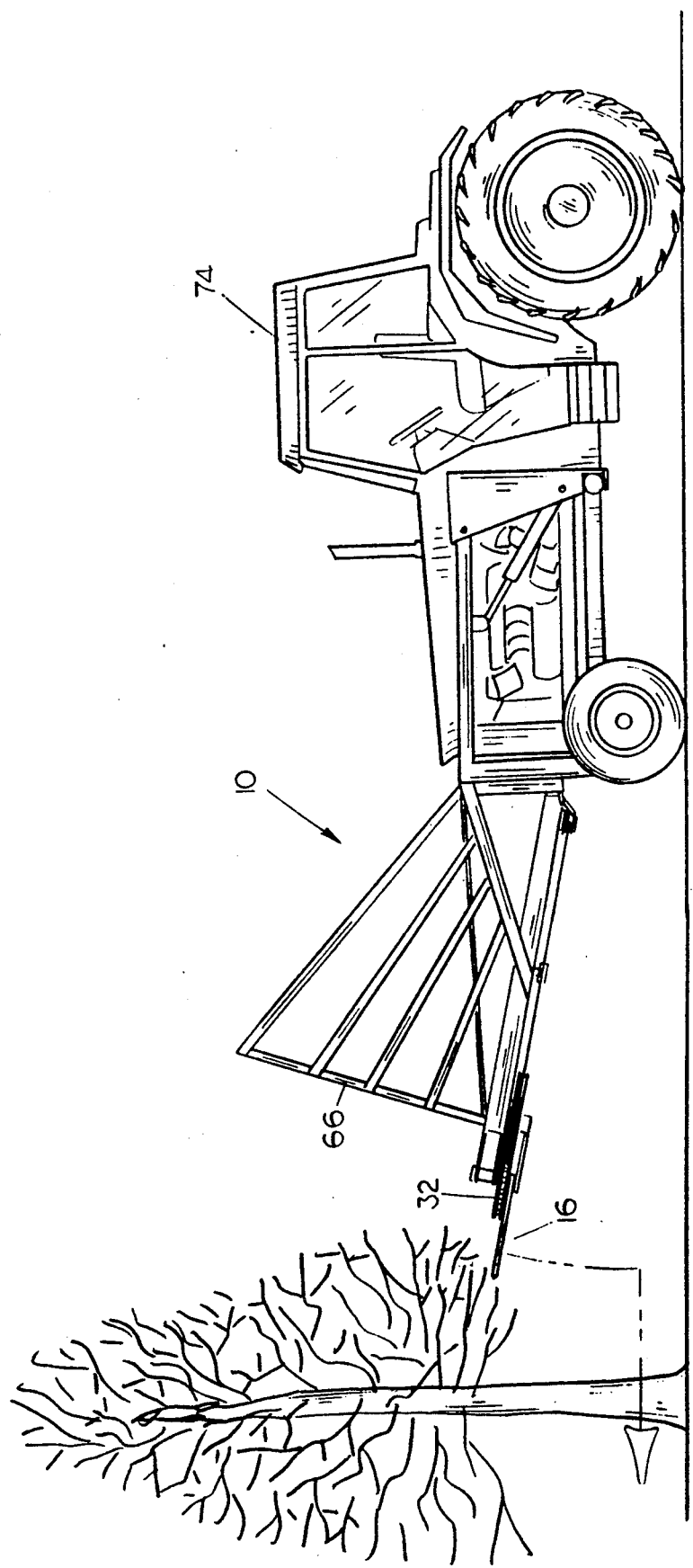
FIG. 7 is an elevational view of the invention attached to the forward end of a tractor.

Referring now to FIG. 7, tree cutting apparatus 10 is shown connected to the forward end of a tractor 74 and may be used to clear scrub trees of the like.

Whereas the invention has been shown and described in connection with the preferred embodiment thereof, it will be understood that many modifications, substitutions and additions may be made which are within the intended broad scope of the appended claims. For example, a variety of hitching apparatus may be utilized on the rearward end of tree cutting apparatus 10 to permit attachment to a wide variety of vehicles. There has therefore been shown and described an improved tree cutting apparatus which accomplishes at least all of the above stated objects.

I claim:

1. A tree cutting apparatus, comprising:

a frame having forward and rearward ends and opposing transverse sides and upper and lower surfaces;

first and second generally planar blade means operably connected to the forward end of said frame parallel to and below the lower surface of said frame, said blade means spaced transversely apart and coplanar to receive material to be cut therebetween;

said blade means having an arcuate peripheral edge, said peripheral edge having a cutting edge formed along a portion thereof with a plurality of teeth therealong, said blade means being rotatably mounted such that rotation of said blade means in a first direction will cause said cutting edges to move towards each other as they rotate, such that said teeth will saw through a tree;

said arcuate cutting edges being formed with respect to the rotational axis of said blade means, said cutting edges having a forward end and a rearward end, said cutting edges being formed such that the distance between the cutting edges and rotational axis increases from the forward end to the rearward end of said cutting edges, such that rotation of said blades in said first direction will cause the cutting edges of said blade means to move closer to each other as they rotate so as to engage and saw through material therebetween, said distance increasing uniformly from the forward end to the rearward end of said cutting edges such that each tooth will saw through an equal amount of material;

drive means on said frame operably connected to said first and second blade means, for operating said blade means for cutting trees;

said drive means being adapted to simultaneously rotate said blade means in opposite rotational directions for less than one full rotation;

said blade means being operable between a first position, wherein the blades are spaced apart, and a second position wherein the blade means have been moved in the first direction until the teeth on the blade means intermesh together such that a tree is completely cut.

2. The tree cutting apparatus of claim 1, wherein said cutting edges extend around said blade means less than the entire peripheral edge.

3. The tree cutting apparatus of claim 1, wherein said cutting edges have forward and rearward ends, and wherein said teeth along said edges are spaced progressively closer together from said forward to rearward ends.

4. The tree cutting apparatus of claim 1, wherein said frame includes a forward transverse cross member, and wherein said blade means are operably mounted such that said cutting edges rotate towards and adjacent to said cross member when rotated in said first direction, said cross member oriented to bias against material being cut by said rotating blade means.

5. The tree cutting apparatus of claim 1, wherein said blade means project forwardly beyond the forward end of said frame and are located below the lower surface of said frame, such that said blade means form the lowest surface on said tree cutting apparatus, whereby a tree may be cut off flush with the ground.

* * * * *